RIBBON REEL CARRIER AND DISPENSER

Filed May 14, 1968

INVENTOR.
ROBERT F. SCHLADALE
BY
Hopgood & Calimafde
ATTORNEYS

United States Patent Office 3,482,684

Patented Dec. 9, 1969

3,482,684

RIBBON REEL CARRIER AND DISPENSER

Robert F. Schladale, Edison, N.J., assignor to Allied Carbon and Ribbon Manufacturing Corporation Filed May 14, 1968, Ser. No. 729,101
Int. Cl. B65b *75/02;* B65d *85/04, 85/66*
U.S. Cl. 206—59 2 Claims

ABSTRACT OF THE DISCLOSURE

A carrier for reels of typewriter ribbon or the like, comprising a flexible card detachably attached to the reel and providing lateral support for the ribbon. The card is attached to the reel by frictional engagement between a hub projecting from the card and a central opening at the reel axis. The reel is transferred from the carrier to the typewriter by placing the hub against the ribbon retaining shaft on the typewriter, and gently pressing on the back of the card until the reel with the ribbon is displaced onto the shaft.

BACKGROUND

The invention is in the field of typewriter ribbon carriers and cartridges.

At present, special attention is required in winding, wrapping and handling reel mounted ribbons to prevent lateral displacement of the ribbon in shipment and when removed from the box. The cartridge mounted ribbons are generally designed to fit only one particular machine which, of course, limits the application of the reels.

Accordingly, it is an object of this invention to provide a reel carrier which laterally supports and protects the ribbon in transit and during handling, and which is not limited to any one particular typewriter.

Another object of the invention is to provide a carrier which is considerably less expensive than known cartridges and perform essentially the same functions; the cost being so little that the carrier may be discarded after installation of the reel mounted ribbon.

Another advantage of the invention is that the use of the supporting card permits the ribbon to be more loosely wound as compared to the conventional reels of ribbon without cartridges with less probability of unwinding, or the ribbon falling off the reel.

Further, the invention permits the mounting of reels on machines without touching the ribbon; and, simplifies storage and packaging of reels by eliminating the need for individual wrapping.

The invention is also compatible with the use of hub adapters for accommodating the reel to machines of different shaft diameters.

SUMMARY

A carrier for typewriter ribbon reels comprising a flexible supporting card detachably attached to the reel, and mounted against one side of the ribbon, to provide lateral support for the ribbon. The card is provided with a centrally located hub which frictionally engages the shaft opening in the center of the reel. The card is generally flat and square, and sufficiently stiff so that it may be stored on edge and yet support the reel in the upright position. It is sufficiently flexible so that the reel may be transferred from the carrier simply by placing the hub against the reel shaft on the typewriter, and gently pressing the back of the card against the reel. In that manner the reel and ribbon are slid off of the hub onto the receiving shaft.

Other objectives, advantages, and various further features of novelty will be pointed out or will occur to those skilled in the art from a reading of the following specification in conjunction with the accompanying drawings.

DETAILED DESCRIPTION OF THE PREFERRED EMBODIMENT

Figure 1:
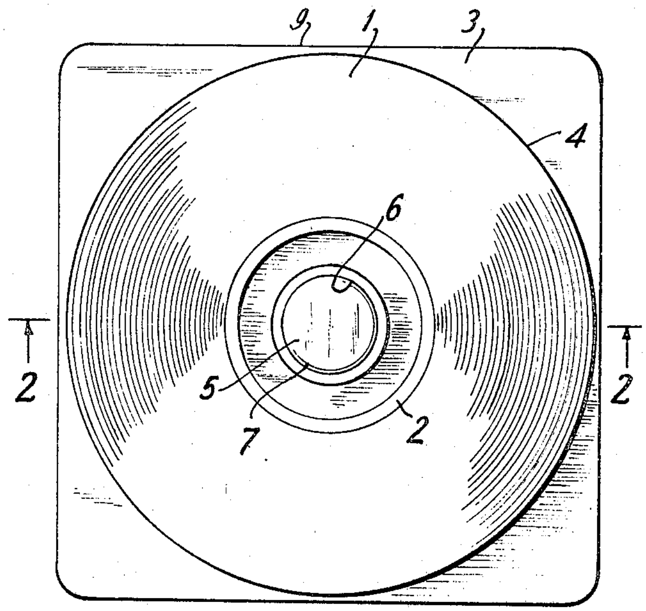
FIG. 1 is a plan view of the novel ribbon carrier with the reel and ribbon mounted thereon.

Referring to FIG. 1, the ribbon 1 is shown wound on a reel 2 against a flat surface of a stiff but flexible carrier card 3.

The card 3 is preferably square to permit packing and storing of the reels and ribbons on edge. The square dimensions of the card 3 are slightly greater than the diameter of the wound ribbon to prevent the outer circumferential surface 4 of the ribbon from contacting its container, or shelf upon which it may be stored; the difference in dimensions, however, should not be such as to cause the card to buckle when the assembly is set on edge.

A hub 5 is molded as part of or, if a separate piece, is attached to the card 3. The hub frictionally fits into the reel shaft opening 6, and thereby secures the card to the reel.

The reel 2 is similar to those currently in use with typewriter ribbons. The reel shaft opening 6 is standard and fits on the typewriter shaft 8 (FIG. 4) located in the conventional typewriter. It is apparent that the reel opening and hub may take other shapes providing only that there be frictional engagement between the two, and that there be cooperation between the reel opening and the shaft.

Figure 2:
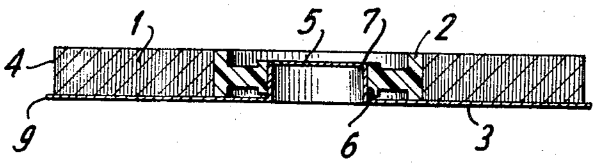
FIG. 2 is a view taken along lines 2—2 of FIG. 1.

Referring now to FIG. 2, the hub is shown as a molded part of the card 3 and the relationship of the hub, card, reel, and ribbon is shown.

Figure 3:
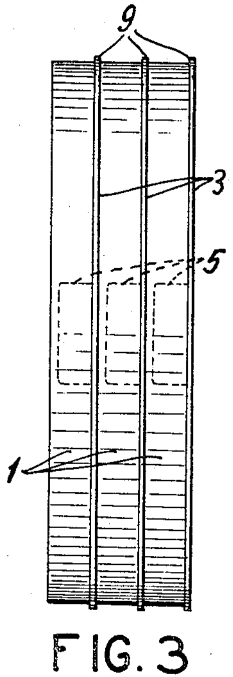
FIG. 3 is a front view of a stack of the reel mounted carriers.

FIG. 3 illustrates the manner in which ribbons carried by the invention may be stacked. The edges 9 of the cards 3 extend beyond the ribbon so as to prevent contact with the adjacent supporting surface, and the cards also serve to separate each ribbon from the adjacent ribbon. A single insert card (now shown) may be placed against the end or top ribbon to provide it with similar protection.

Figure 4:
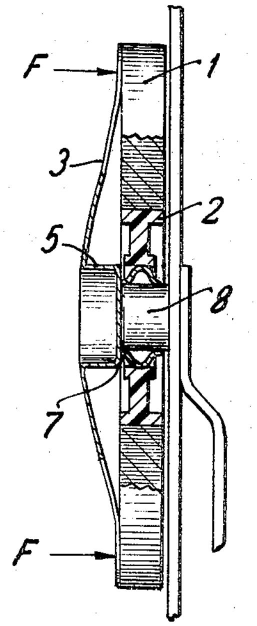
FIG. 4 is a side view of the invention illustrating the transfer of the reel from the carrier to the typewriter reel shaft.

FIG. 4 illustrates the manner in which the reel and ribbon assembly is transferred from the card carrier to the typewriter. The hub 5 is aligned with the shaft 8 of the typewriter. Gentle pressure applied at areas F on the card, as illustrated, will cause the reel-ribbon assembly to slide off the hub 5 and onto shaft 8. When the transfer is completed, the assembly is supported by the shaft 8. The carrier card may then be discarded, or used for storage of used ribbons or tapes as may be desired.

It is thus seen that the ribbon carrier of the invention provides most if not all of the advantages of the cartridge carriers, without the limitations inherent therein and at a fraction of the cost.

While the principles of the invention have been described in connection with specific apparatus, it is to be understood that this description is made only by way of example and not as a limitation to the scope of the invention. For example, the word ribbon is intended to cover paper, plastic, fabric and tapes.

What is claimed is:

1. A ribbon carrier which supports a typewriter ribbon-reel assembly when such assembly is not mounted on a typewriter, and which facilitates transferring the assembly onto the typewriter when required, comprising a substantially flat and flexible card, said card having a cylindrical depression therein and a complementary cylindrical protruding surface which comprises a hub centrally located on the card and frictionally engaging a shaft opening in said ribbon reel, said hub corresponding in cross-sectional shape to a typewriter shaft adapted to carry said ribbon-reel assembly, and said assembly being transferred to the typewriter shaft by aligning the hub with the shaft and applying a suitable force to the card in a direction to force said assembly onto the shaft.

2. The carrier of claim 1 wherein the face dimensions of said card are slightly greater than the diameter of said ribbon, and wherein said card is sufficiently stiff to maintain its shape when rested on edge with the ribbon-reel assembly mounted thereon.

References Cited

UNITED STATES PATENTS

| | | | |
|---|---|---|---|
| 2,571,133 | 10/1951 | Haynes. | |
| 2,660,296 | 11/1953 | Dunning | 206—65 |
| 2,700,463 | 1/1955 | McCormick | 206—52 |
| 3,380,581 | 4/1968 | Landgraf | 197—151 |

WILLIAM T. DIXSON, Jr., Primary Examiner

U.S. Cl. X.R.

197—151; 206—65; 242—68.5